United States Patent
Babel et al.

(10) Patent No.: US 10,921,156 B2
(45) Date of Patent: Feb. 16, 2021

(54) ROTARY ENCODER WITH ADDITIVE MANUFACTURING FEATURES

(71) Applicant: Simmonds Precision Products, Inc., Vergennes, VT (US)

(72) Inventors: Andrew S. Babel, West Hartford, CT (US); Jagadeesh Kumar Tangudu, South Windsor, CT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 216 days.

(21) Appl. No.: 15/949,883

(22) Filed: Apr. 10, 2018

(65) Prior Publication Data

US 2019/0310108 A1 Oct. 10, 2019

(51) Int. Cl.
*G01D 5/20* (2006.01)
*G01D 5/14* (2006.01)
*G01B 1/00* (2006.01)

(52) U.S. Cl.
CPC .......... *G01D 5/2033* (2013.01); *G01D 5/145* (2013.01)

(58) Field of Classification Search
CPC ........ B22F 1/00; B22F 2201/00; B33Y 10/00; B28B 1/00; B28B 21/00; G01B 1/00; G01B 2210/00
See application file for complete search history.

(56) References Cited

U.S. PATENT DOCUMENTS

| 10,197,419 B2* | 2/2019 | Deak ........................ G01B 7/30 |
| 2010/0038527 A1* | 2/2010 | Madore .............. G01D 5/34707 |
| | | 250/231.13 |
| 2012/0161758 A1* | 6/2012 | Hibino ................. G01N 27/902 |
| | | 324/239 |
| 2015/0369628 A1 | 12/2015 | Deak et al. |

(Continued)

FOREIGN PATENT DOCUMENTS

| EP | 1496339 A2 | 1/2005 |
| EP | 3091339 A1 | 11/2016 |

(Continued)

OTHER PUBLICATIONS

Extended European Search Report for EP Application No. 19167772.3, dated Aug. 12, 2019, pp. 8.

(Continued)

*Primary Examiner* — Jermele M Hollington
*Assistant Examiner* — Temilade S Rhodes-Vivour
(74) *Attorney, Agent, or Firm* — Kinney & Lange, P.A.

(57) ABSTRACT

A rotary encoder may include a magnetic encoder disc having a plurality of magnetic features added to the disc by additive manufacturing distributed over a surface of the encoder disc, wherein the disc is configured for attachment to the end of a rotatable shaft, or a cylindrical metallic encoding feature having a plurality of magnetic features added to the cylindrical encoder by additive manufacturing distributed over the surface of the cylindrical encoding feature, wherein the encoding feature is capable of attach- (Continued)

ment to an outer diameter of the rotatable shaft. The encoder additionally includes a magnetic sensor positioned adjacent to the end of the rotatable shaft to detect magnetic signals from the magnetic features on the disc and/or positioned over the surface of the rotatable shaft to detect magnetic signals from the magnetic features on the encoding feature.

20 Claims, 6 Drawing Sheets

(56) References Cited

U.S. PATENT DOCUMENTS

| | | | |
|---|---|---|---|
| 2016/0217894 A1* | 7/2016 | Ausserlechner | H01F 7/0205 |
| 2016/0313139 A1 | 10/2016 | Klecka et al. | |
| 2016/0356805 A1* | 12/2016 | Schneider | G01P 13/02 |
| 2017/0126087 A1* | 5/2017 | Soderberg | H02K 1/17 |
| 2017/0146365 A1* | 5/2017 | Hanke | G01D 5/12 |
| 2017/0292855 A1* | 10/2017 | Kaste | G01D 5/142 |
| 2017/0370961 A1* | 12/2017 | Hashimoto | G01P 1/103 |
| 2018/0095450 A1* | 4/2018 | Lappas | B33Y 10/00 |

FOREIGN PATENT DOCUMENTS

| | | |
|---|---|---|
| GB | 2532789 A | 6/2016 |
| JP | 2017003312 A | 1/2017 |
| WO | 2015185262 A1 | 12/2015 |

OTHER PUBLICATIONS

Communication Pursuant to Article 94(3) EPC for EP Application No. 19167772.3, dated Oct. 28, 2020, pp. 5.

* cited by examiner

US 10,921,156 B2

ROTARY ENCODER WITH ADDITIVE MANUFACTURING FEATURES

BACKGROUND

The present invention relates generally to sensor systems and more particularly to magnetic encoder features for magnetic sensor systems.

Rotary encoders operate by sensing signals generated by features passing by a detector that are then captured and analyzed by electronic circuitry to produce position and motion data for a moving object. Popular sensing means are optical and magnetic. In contrast to optical encoders, magnetic encoder systems do not require additional activation sources such as LED or photodiode light sources, and are preferred for applications operating in higher shock vibration and contamination environments.

The accuracy of an encoder output is a function of the resolution of the detector and the dimensions and number of the detectable features on the moving object.

SUMMARY

A rotary encoder may include a magnetic encoder disc comprising a plurality of linear, areal, and/or other geometric magnetic features added to a planar encoder disc by additive manufacturing distributed over a surface of the encoder disc for attachment to an end of a rotatable shaft. The rotary encoder assembly may also include a cylindrical magnetic encoder feature comprising a plurality of linear, areal, and/or other geometric magnetic features added to a cylindrical encoding feature by additive manufacturing distributed over a surface of the encoding feature configured for attachment to an outer diameter surface of the rotatable shaft. The encoder also includes a magnetic sensor positioned adjacent to the end of the rotatable shaft to detect magnetic signals from the magnetic features on the planar encoder disc, and/or positioned adjacent to the outer diameter surface of the rotatable shaft to detect magnetic signals from the magnetic features on the cylindrical encoding feature.

In an embodiment, a rotary encoder arrangement may include a member attachable to a shaft having a magnetizable feature additively manufactured thereto and a sensor in operable communication with the magnetizable feature configured to output a signal indicative of at least one of an absolute rotational position of the shaft and a relative rotational position of the shaft.

In an embodiment, a rotary encoder arrangement comprises a member attachable to a shaft having a magnetizable feature additively manufactured thereto and a sensor in operable communication with the magnetizable feature configured to output a signal indicative of at least one of an absolute rotational position of the shaft and a relative rotational position of the shaft.

In an embodiment, a method of making a rotary encoder includes adding via additive manufacturing a magnetizable feature to a member and attaching the member to a shaft. The method further includes fixing a sensor proximate the magnetizable feature such that at least one of an absolute rotational position of the shaft can be determined by the output of the sensor.

DETAILED DESCRIPTION

Rotary encoders are electromechanical devices that convert the angular position or motion of a rotatable shaft to an analog or digital signal. Absolute encoders indicate the current position of the shaft. Relative encoders provide information about the motion of the shaft. Encoders typically rely on information generated by features in or on a rotating shaft detected by fixed sensors positioned near the shaft.

The present disclosure describes a magnetic rotary encoder structure comprising linear, areal, and other magnetic features circumferentially distributed over the surface of a planar inductive rotary encoder disc capable of attachment to the end of a rotatable shaft and to the surface of a cylindrical inductive encoding feature containing linear, areal, and other magnetic features radially distributed over the surface of the cylindrical feature capable of attachment to the outside diameter of the rotatable shaft wherein the magnetic features have high resolution and are formed by additive manufacturing.

When a magnetic rotary encoder structure rotates relative to a fixed sensor, the magnetic field of the encoder is detected by the sensor and an output signal is generated that characterizes the position of the encoder. The encoder structure and angular positioning of the sensor components may be used to generate a digital code representing the angular position of the rotating encoder.

Figure 1:
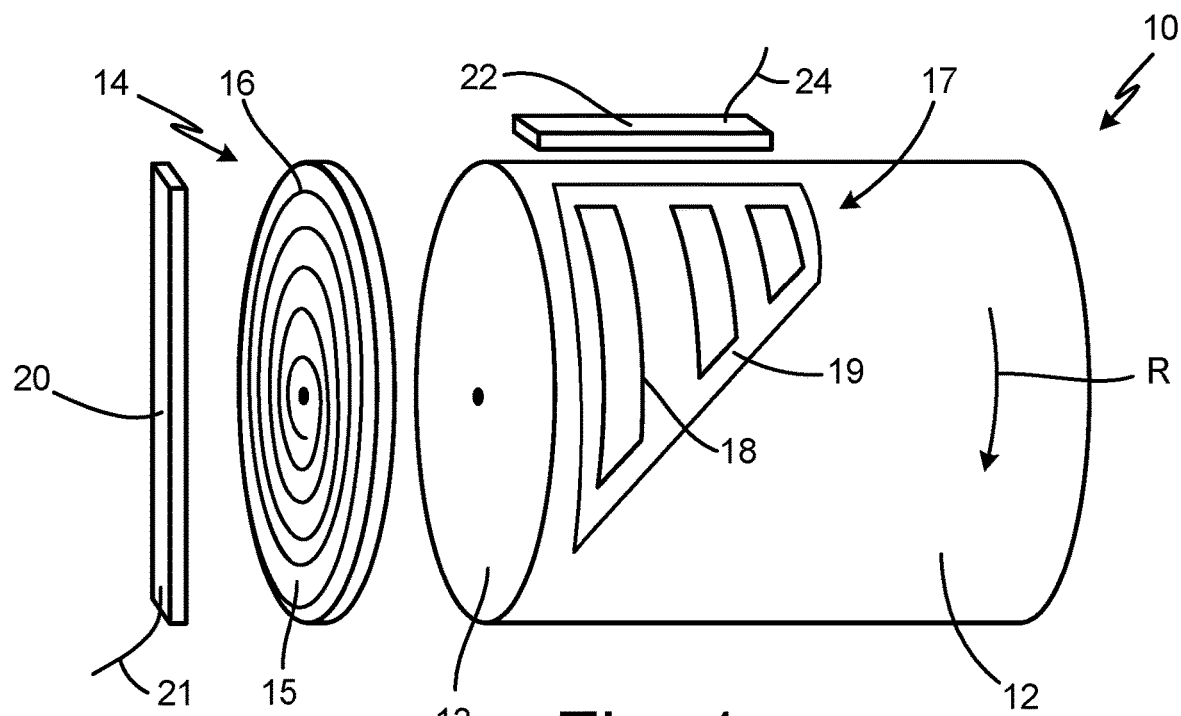
FIG. 1 is a schematic representation of a magnetic planar rotary encoder disc and a cylindrical magnetic encoding feature.

A schematic illustration of a rotary encoder structure is shown in FIG. 1. Rotary encoder structure 10 comprises shaft 12 with planar rotary magnetic encoder disc 14 positioned at the end of shaft 12, and cylindrical rotary encoding feature 17 positioned on the outside diameter of shaft 12, in forms that allow planar rotary magnetic encoder disc 14 and cylindrical rotary encoding feature 17 to be attached to the end and outside diameter of shaft 12, respectively. Magnetic rotary encoder disc 14 may be in the form of a planar encoder disc 15 containing linear, areal, and other magnetic features 16 formed on the surface of disc 15. Disc 15 may be formed from a non-magnetic metal and may be circular in shape. Cylindrical rotary encoding feature 17 may be in the form of a thin cylindrical object that may have the same radius of curvature as shaft 12. Cylindrical encoding feature 17 may contain linear, areal, and other magnetic features 18 formed on the surface of cylindrical feature 19. Cylindrical feature 19 may be formed from a non-magnetic metal. Magnetic sensor enclosure 20 may have a linear shape and may be located adjacent to and facing the surface of disc 15. Electrical lead 21 may be provided to allow connection to magnetic sensors located in magnetic sensor enclosure 20. Magnetic sensor enclosure 20 may be a radial sensor for magnetic rotary encoder disc assembly 14 and may have a length at least as long as the diameter of magnetic rotary encoder disc assembly 14. Magnetic sensor enclosure 22 may have a linear shape and may be located adjacent to and facing the outside diameter surface of shaft 12, so as to be facing the surface of cylindrical FIG. 19 for certain rotational phases of shaft 12. Electrical lead 24 may be provided to allow connection to magnetic sensors located in magnetic sensor enclosure 22. Magnetic sensor enclosures 20 and 22 and related sensors will be described in more detail below.

When used as a decoder, rotary planar magnetic encoder disc 14 may be attached to end face 13 of rotatable shaft 12. Sensor 20 may be attached in a fixed position near the surface of disc 14 in order to detect signals emanating from features 16 on disc 15. During operation, shaft 12 may rotate in the direction of arrow R, and the linear, areal, and other magnetic features on disc 15 may generate magnetic signals captured by sensors in electromagnetic sensor enclosure 20 that may be electronically analyzed to generate real time information on the position and motion of rotatable cylindrical shaft 12. Magnetic sensor enclosure 22 may be attached in a fixed position near the outside diameter surface of cylindrical shaft 12. During operation, shaft 12 may rotate in the direction of arrow R, and linear, areal, and other magnetic features 18 on FIG. 19 may generate magnetic signals that may be captured by sensors in magnetic sensor enclosure 22 and electronically analyzed to generate real time information on the position and motion of cylindrical shaft 12.

The magnetic features deposited on disc 15 and attachment 19 may be soft or hard magnetic alloys. Soft magnetic alloys are preferred. Suitable magnetic alloys include, but are not limited to, Fe, Ni—Fe alloys, Co—Fe alloys, permalloy ($Fe_{15}Ni_{80}Mo_5$), permendur ($Fe_{49}Co_{49}V_2$) and others known in the art.

Figure 2:
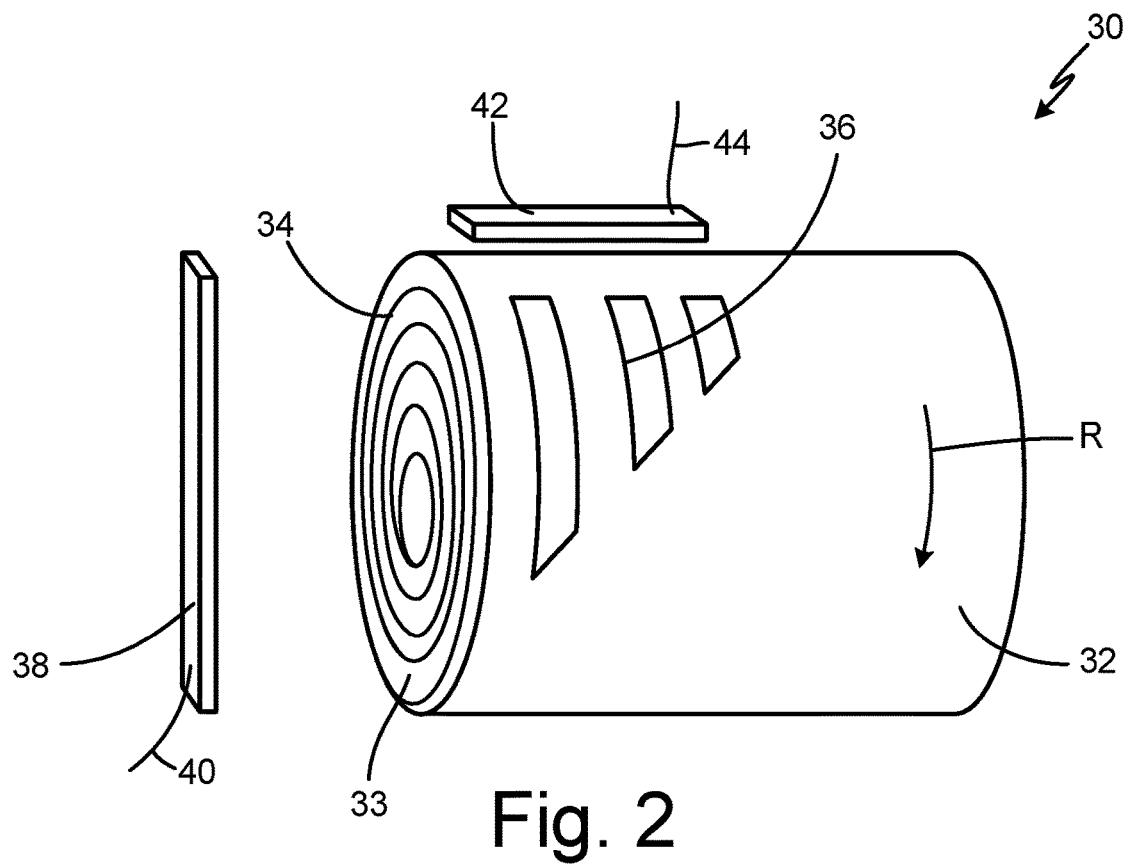
FIG. 2 is a schematic representation of a magnetic planar rotary encoding feature and a cylindrical magnetic encoding feature.

A schematic illustration of another embodiment of a rotary encoder structure is shown in FIG. 2. Rotary encoder structure 30 may comprise cylindrical shaft 32 with magnetic sensor enclosure 38 and electrical lead 40 positioned over the end 33 of shaft 32. The encoder structure may also include magnetic sensor enclosure 42 with electrical lead 44 positioned over the outside diameter surface of shaft 32. Linear, areal, and other magnetic features 34 may be formed directly on end 33 of metallic shaft 32 in this case and linear, areal, and other magnetic features 36 may also be formed directly on the outside diameter surface of shaft 32. During operation, shaft 32 may rotate in the direction of arrow R and the linear, areal, and other magnetic features 34 on the end 33 of shaft 32 may generate a magnetic signal that may be detected by magnetic sensors in magnetic sensor enclosure 38 and captured and electronically analyzed to generate real time information on the position and motion of shaft 32. In a similar fashion, linear, areal, and other magnetic features 36 on the outside diameter surface of shaft 32 may generate a magnetic signal that may be detected by magnetic sensors in magnetic sensor enclosure 42 and captured and electronically analyzed to generate real time information on the position and motion of shaft 32.

Figure 3:
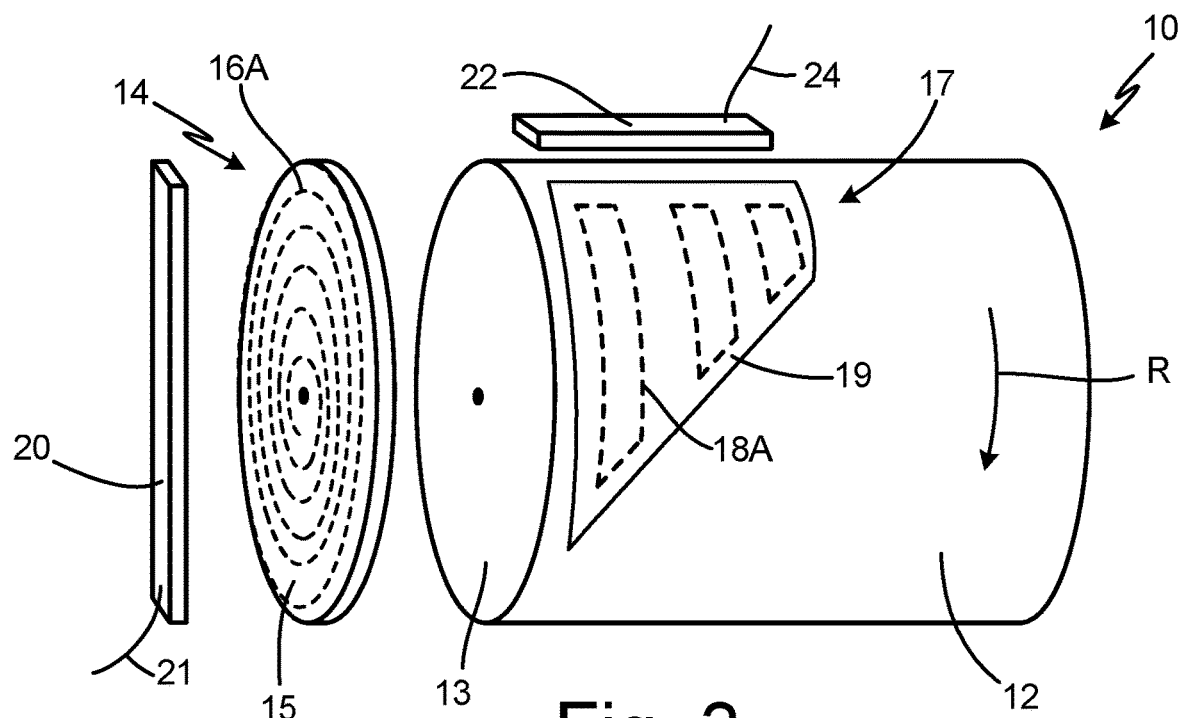
FIG. 3 is a schematic representation of a magnetic planar rotary encoder disc and a cylindrical magnetic encoding feature.
Figure 4:
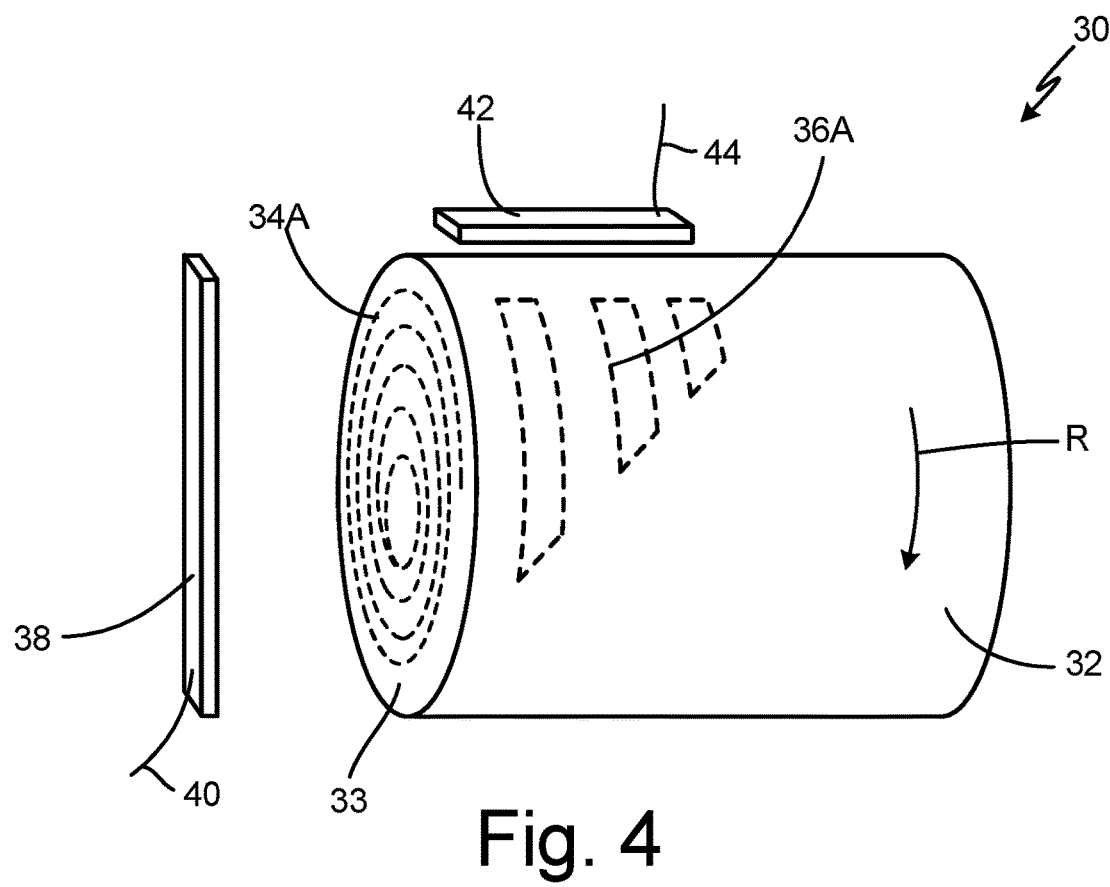
FIG. 4 is a schematic representation of a planar magnetic rotary encoding feature and a cylindrical magnetic encoding feature.

Information contained in linear, areal, and other magnetic features on encoder disc 14 and cylindrical attachment 17 may be enhanced by fragmenting the features to provide an increased density of detectable features in each assembly. An example is shown in FIG. 3 wherein linear, areal, and other magnetic features 16A and 18A on encoder disc 14 and cylindrical attachment 17 are interrupted by blank spaces. The blank spaces may be spaced on the circumference of the features in such a fashion that would provide additional information. The spaces may be of different lengths and pitches in an embodiment, circles may have different radii with different spaced patterns. In a similar fashion linear, areal, and other features 34A and 36A directly formed on end 33 and outside diameter surface of shaft 32 shown in FIG. 4 contains blank spaces thereby increasing the detectable features and resulting information density in each.

Figure 5:
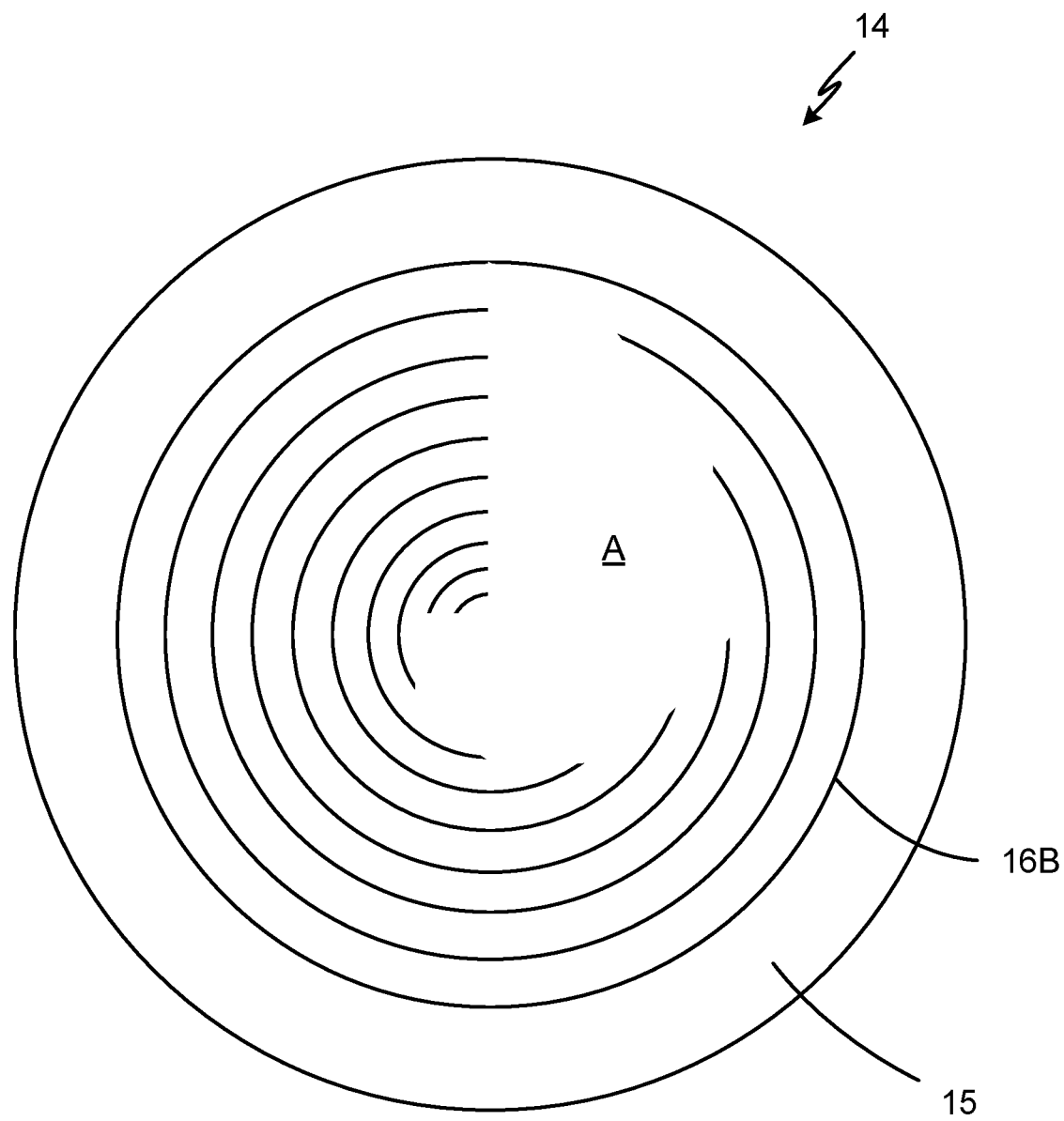
FIG. 5 is an embodiment of an alternate rotary encoder disc feature.
Figure 6:
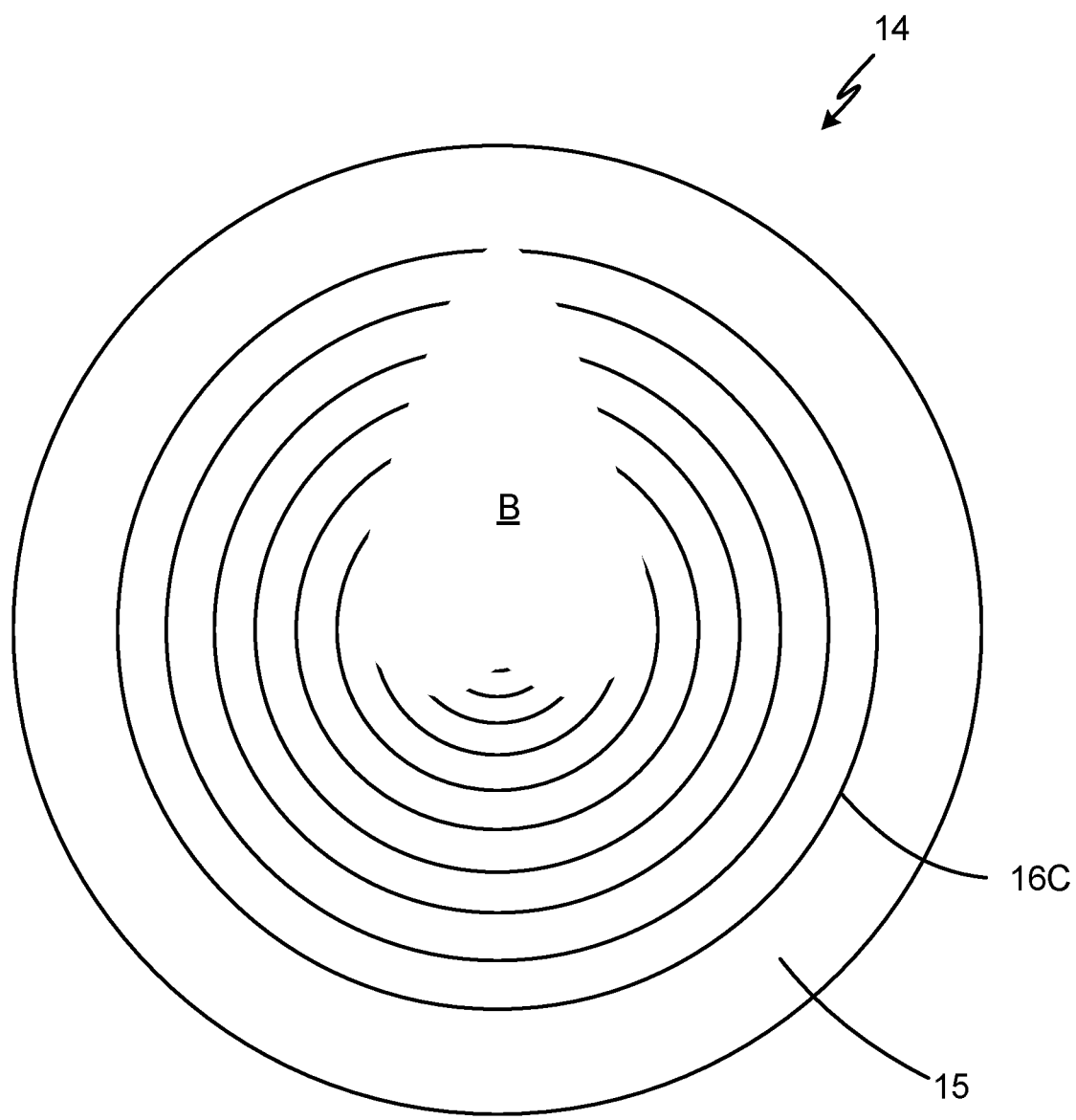
FIG. 6 is an embodiment of an alternate rotary encoder disc feature.

Embodiments of alternate encoder disc features on encoder disc 14 are shown in FIGS. 5 and 6. In FIG. 5, encoder disc 14 contains linear features 16B and blank areal feature A on surface 15 of disc 14. In FIG. 6, encoder disc 14 contains linear features 16B and blank areal feature B on surface 15 of disc 14.

In rotary encoder structure 10 shown in FIG. 1, planar magnetic encoder disc 14 containing magnetic features 16 and cylindrical magnetic encoder attachment 17 containing magnetic features 18, the magnetic features may be formed by additive manufacturing. Similarly, in rotary magnetic encoder structure 30 shown in FIG. 2, magnetic features 34 on end 33 and magnetic features 36 on the outside diameter surface of shaft 32 may be formed by additive manufacturing.

Figure 7:
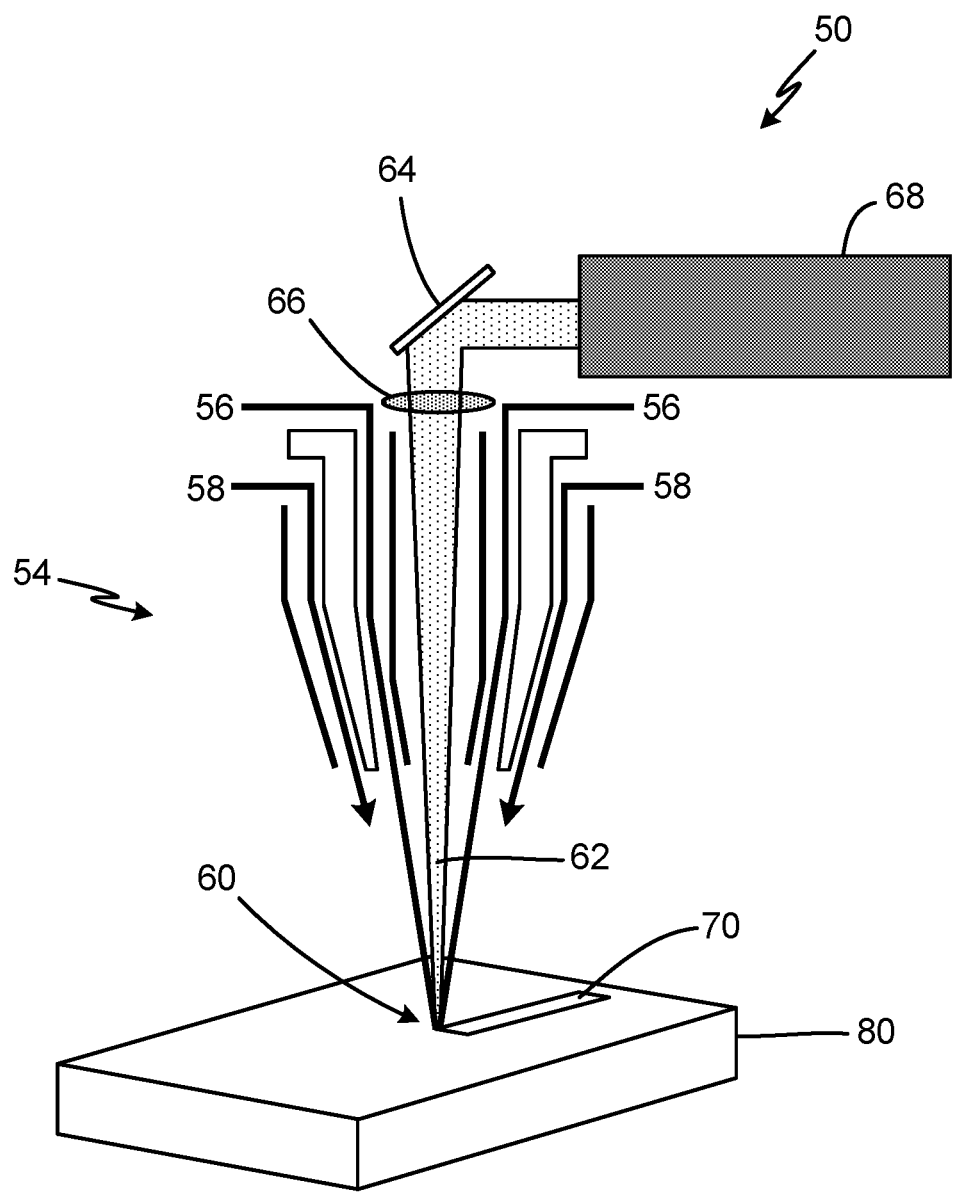
FIG. 7 is a schematic illustration of a direct metal deposition additive manufacturing process.

Common additive manufacturing techniques include laser engineered net shaping (LENS), shape deposit manufacturing (SDM), direct light manufacturing (DLM), laser metal deposition (LMD), direct metal deposition (DMD), cold spray, direct write, powder bed deposition, wire arc deposition, and others known in the art. An example of a suitable DMD process is schematically shown in FIG. 7. FIG. 7 illustrates direct metal deposition process 50 producing a linear track of soft magnetic material 70 on substrate 80. In DMD process 50, coaxial nozzle 54 directs metal powder 56 at substrate 80 under shield of inert gas 58. In process 50, laser 68 is energized and laser beam 62 is directed off mirror 64 through focusing lens 66 at deposition focal point 60, where laser beam 62 melts powder 56 and adds to the deposited linear track of magnetic material 70 on substrate 80. Mirror 64, lens 66, and laser 68 are controlled by a control system (not shown) in process 50. The dimensional accuracy of a DMD deposition process is about 254 microns or 0.010 inches. As noted above, the features may be spiral, concentric, continuous, discontinuous, random and others known in the art. The benefits of employing additive manufacturing to create these structural and magnetic features include the creation of precise planar and three dimensional random and ordered shapes, in the case of magnetic encoder disc assembly 14 and magnetic encoder attachment assembly 17, without the need of precise machining procedures. In addition, the precise geometrical shapes and narrow line widths of magnetic features produced by additive manufacturing contribute to accurate data retrieval of the inductive encoder. The amount of magnetic sensing material deposited by additive manufacturing may be minimal.

Metallic rotary magnetic encoder structures of a part formed by additive manufacturing of the present disclosure may be formed of non-magnetic material and may contain linear, areal, and other magnetic signature features that may be surface features or may be 3D magnetic features embedded in the part. A rotary encoder component may be completely formed from a magnetic material and detectable structures may be formed on the surface of the part by removing magnetic material leaving linear and areal magnetic features on the surface of the part. The surface features may be formed by conventional machining processes or may be formed during additive manufacturing. Additive manufacturing may also be used to form machine structures such as shafts 12 and 32 of the present disclosure that contain linear and areal magnetic features formed in the shafts or on the shafts by additive manufacturing.

Figure 8A:
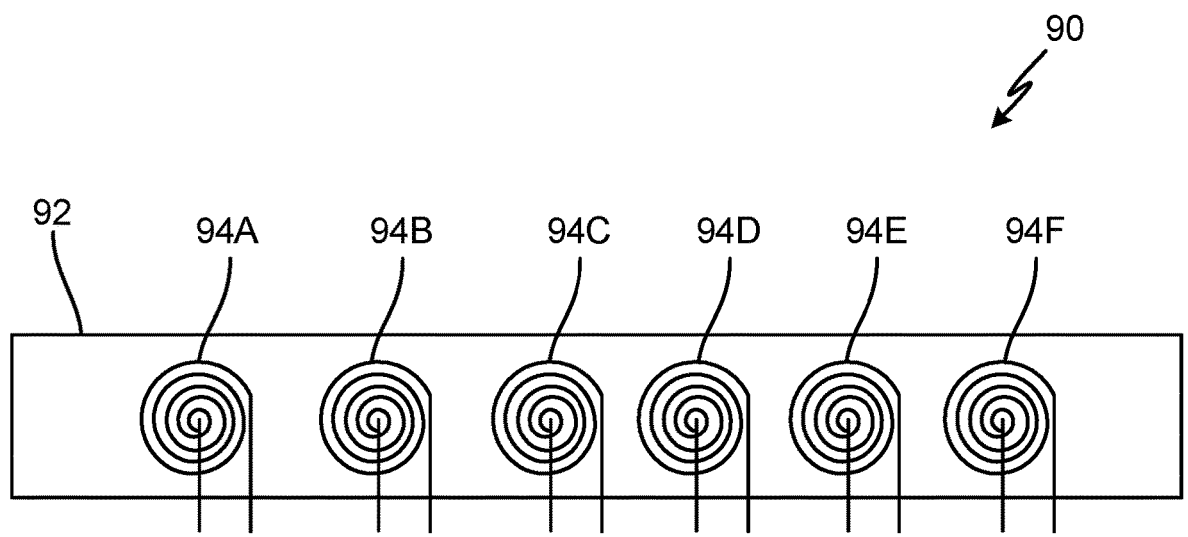
FIG. 8A is a diagram of a linear magnetic induction sensor.
Figure 8B:
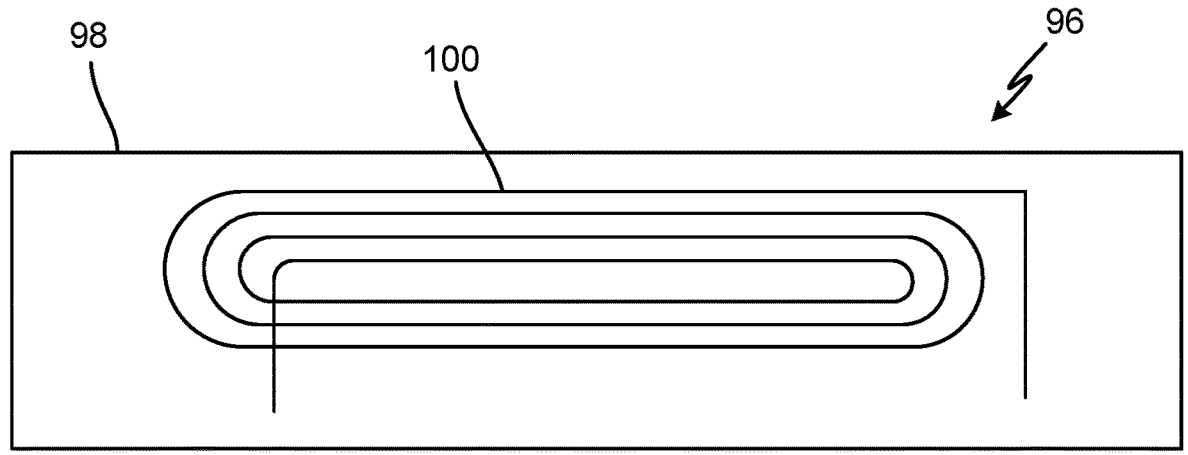
FIG. 8B is a diagram of a linear magnetic induction sensor.

Magnetic sensors according to the present disclosure are magnetic induction coil sensors. The sensors may be used to detect the position and velocity of a rotating shaft at any time as a result of electronic processing of signals detected by the sensors from linear, areal, and other magnetic features on a rotating shaft. Although the sensors of the present disclosure are induction coil sensors, the sensors are not limited to induction coil sensors and other magnetic sensors known in the art may be employed. Embodiments of induction coil sensors of the present disclosure have flat planar shapes and are contained in linear enclosures. Linear sensor 90, shown in FIG. 8A, is an example of sensors 20, 22, 38, and 42 of the present disclosure. Sensor 90 comprises linear enclosure 92 and a linear array of individual coils 94 A-F. Sensor 96 shown in FIG. 8B comprises a single elongated coil 100 in linear enclosure 98 and is another example of sensors 20, 22, 38, and 42 of the present disclosure. Compact induction coil sensors for the encoder of the present disclosure may be many shapes formed by additive manufacturing. Example shapes include flat, conical, conformal, spiral, and others known in the art. As noted above, the dimensional accuracy of representative DMD processing about 254 microns or 0.010 inches.

Benefits of the present disclosure include the implementation of soft magnetic features on encoding figures. Electromagnetic coil sensors employ an applied AC current to detect variations in inductance of the system. Since permanent magnetization is not required, the concept is suitable for elevated temperature applications as well as less expensive material and post-manufacturing processes.

Discussion of Possible Embodiments

The following are non-exclusive possible embodiments of the present invention.

A rotary encoder may include a magnetic encoder disc containing a plurality of linear, areal, and/or other geometric magnetic features added to the planar encoder disc by additive manufacturing distributed over a surface of the encoder disc configured for attachment to an end of a rotatable shaft. The encoder may also include a cylindrical magnetic encoder feature comprising a plurality of linear, areal, and/or other geometric magnetic features added to a cylindrical encoding feature by additive manufacturing distributed over a surface of the encoding feature configured for attachment to an outer diameter surface of the rotatable shaft. The encoder may also include a magnetic sensor positioned adjacent to the end of the rotatable shaft to detect magnetic signals from the magnetic features on the planar encoder disc, and/or positioned adjacent to the outer diameter surface of the rotatable shaft to detect magnetic signals from the magnetic features on the cylindrical encoding feature.

The rotary encoder of the preceding paragraph can optionally include, additionally and/or alternatively, any one or more of the following features, configurations, and/or additional components.

The linear, areal, and/or other geometric magnetic features may be distributed over the surface of the planar encoder disc and/or over the surface of the cylindrical encoding feature as planar or three dimensional features.

The planar or geometrical magnetic features may include at least one of planar and/or three dimensional spiral, concentric, continuous, discontinuous random and/or ordered features.

The electronics connected to the inductive encoder may be configured for generating a signature associated with an angular position of the encoder disc or encoding feature according to the magnetic signals emanating from the encoder disc or encoding feature due to the exultation of coils of the magnetic sensor.

The planar encoder disc or cylindrical encoding feature, including non-magnetic and magnetic portions, may be formed by additive manufacturing.

The entire encoder disc or encoding feature may be formed from a magnetic material, and the magnetic features may include depressions formed on the planar encoder disc or cylindrical encoding feature by removing material from the encoder disc or encoding feature by using conventional machining techniques or during additive manufacturing.

The magnetic sensor may include one or more electrical sensing coils within a narrow linear confinement.

The magnetic features may be added by an additive manufacturing process that comprises one or more of selective laser sintering, selective laser melting, electron beam melting, directed energy deposition, laser metal deposition, cold spray, direct write, powder bed deposition, and wire arc deposition.

The linear accuracy of the magnetic features may be about 254 microns (0.010 inches).

The magnetic features may be soft magnetic materials and/or hard magnetic materials.

A rotary encoder arrangement may include a member attachable to a shaft having a magnetizable feature additively manufactured thereto. The rotary encoder may also have a sensor in communication with the magnetizable feature configured to output a signal indicative of at least one of an absolute rotational position of the shaft and a relative rotational position of the shaft.

The rotary encoder of the preceding paragraph can optionally include, and/or alternatively, any one or more of the following features, configurations and/or additional components.

At least one magnetizable feature may include linear, areal, and/or other magnetic features circumferentially distributed over the surface of the planar encoder disc or cylindrical feature, and may include at least one of planar or three dimensional, spiral, concentric, continuous, and discontinuous random and ordered features.

A processor electrically connected to sensor may generate a code associated with an angular position of the planar encoder disc or cylindrical encoding feature according to magnetic signals emanating from the disc or feature.

The magnetizable features may have a resolution of linear accuracy of about 254 microns (0.010 inches).

A method of making a rotary encoder includes adding via additive manufacturing a magnetizable feature to a member. The method further includes fixing a sensor proximate the magnetizable feature such that at least one of the an absolute rotational position of the shaft and a relative rotational position of the shaft may be determined by the output of the sensor.

The method of the preceding paragraph can optionally include, additionally and/or alternatively, any one or more of the following features, configurations, and/or additional components.

Magnetizable features may be planar, areal, and/or three dimensional geometrical features including at least one of spiral, concentric, continuous, discontinuous random and/or ordered planar and/or three dimensional features.

Forming the magnetizable features on the member by additive manufacturing may include at least one of selective laser sintering, selective laser melting, electron beam melting, directed energy deposition, laser metal deposition, cold spray, direct write, powder bed deposition, and wire arc deposition.

Electronics connected to the sensor may be configured for generating a signature associated with an angular position of the shaft according to magnetic signals emanating from the magnetic features on the shaft.

The members may be planar metallic encoder discs and/or cylindrical encoding features.

The magnetic features may include soft magnetic materials and/or hard magnetic materials.

The invention claimed is:

1. A rotary encoder comprising:
    a planar magnetic encoder disc comprising a plurality of linear, areal, and/or other geometric magnetic features added to the planar encoder disc by additive manufacturing distributed over a surface of the encoder disc configured for attachment to an end of a rotatable shaft, wherein the linear, areal, and/or other geometric magnetic features are interrupted by blank spaces to provide additional information;
    a cylindrical magnetic encoder feature comprising a plurality of linear, areal, and/or other geometric magnetic features added to a cylindrical encoder feature by additive manufacturing distributed over a surface of the encoder feature configured for attachment to an outer diameter surface of the rotatable shaft, wherein the linear, areal, and/or other geometric magnetic features are interrupted by blank spaces to provide additional information;
    a first magnetic sensor positioned adjacent to the end of the rotatable shaft to detect magnetic signals from the magnetic features on the planar encoder disc; and
    a second magnetic sensor positioned adjacent to the outer diameter surface of the rotatable shaft to detect magnetic signals from the magnetic features on the cylindrical encoding feature.

2. The rotary encoder of claim 1 wherein the linear, areal and/or other geometric magnetic features are distributed over the surface of the planar encoder disc and/or over the surface of the cylindrical encoding feature as planar or three dimensional features.

3. The rotary encoder of claim 2, wherein the planar or geometrical magnetic features comprise at least one of planar and/or three dimensional spiral, concentric, continuous, discontinuous random and/or ordered features.

4. The rotary encoder of claim 1, wherein electronics connected to the rotary encoder are configured for generating a signature associated with an angular position of the encoder disc or encoding feature according to the magnetic signals emanating from the encoder disc or encoding feature due to excitation of coils of the magnetic sensor.

5. The rotary encoder of claim 1 wherein the entire planar encoder disc or cylindrical encoding feature, including nonmagnetic and magnetic portions, is formed by additive manufacturing.

6. The rotary encoder of claim 5 wherein the entire encoder disc or encoding feature is formed from a magnetic material, and the magnetic features comprise depressions formed on the planar encoder disc or cylindrical encoding feature by removing material from the encoder disc or encoding feature by using conventional machining techniques or during additive manufacturing.

7. The rotary encoder of claim 1 wherein the magnetic sensor comprises one or more electrical sensing coils within a narrow linear confinement.

8. The rotary encoder of claim 1 wherein the magnetic features are added by an additive manufacturing process that comprises one or more of selective laser sintering, selective laser melting, electron beam melting, directed energy deposition, laser metal deposition, cold spray, direct write, powder bed deposition, and wire arc deposition.

9. The rotary encoder of claim 1 wherein a linear accuracy of the magnetic features is about 254 microns (0.010 inches).

10. The rotary encoder of claim 1 wherein the magnetic features comprise soft magnetic materials and/or hard magnetic materials.

11. A rotary encoder arrangement comprising:
    a first member attachable to a shaft having a first magnetizable feature additively manufactured thereto, wherein the first magnetizable feature is interrupted by blank spaces to provide additional information;
    a second member attachable around an outer diameter of the shaft having a second magnetizable feature additively manufactured thereto, wherein the second magnetizable feature is interrupted by blank spaces to provide additional information; and
    a sensor in operable communication with the first magnetizable feature configured to output a signal indicative of at least one of an absolute rotational position of the shaft and a relative rotational position of the shaft.

12. The rotary encoder arrangement of claim 11 wherein the magnetizable feature comprises at least one linear, areal, and/or other three dimensional geometric feature circumferentially distributed over the surface of the planar encoder disc or cylindrical feature, and comprises at least one of planar or three dimensional spiral, concentric, continuous, and discontinuous random and ordered features.

13. The rotary encoder arrangement of claim 11 further comprising a processor electrically connected to the sensor and configured for generating a code associated with an angular position of the planar encoder disc or cylindrical encoding feature according to magnetic signals emanating from the disc or feature.

14. The rotary encoder arrangement of claim 11 wherein the magnetizable features have a resolution of linear accuracy of about 254 microns (0.010 inches).

15. A method of making a rotary encoder, comprising:
    adding via additive manufacturing a first magnetizable feature to a first member, wherein the first magnetizable feature is interrupted by blank spaces to provide additional information;
    attaching the first member to a shaft;
    adding via additive manufacturing a second magnetizable feature to a second member, wherein the second magnetizable feature is interrupted by blank spaces to provide additional information;
    attaching the second member around an outer diameter of the shaft; and
    fixing a first sensor proximate the first magnetizable feature such that at least one of an absolute rotational position of the shaft and a relative rotational position of the shaft can be determined by the output of the sensor.

16. The method of claim 15 wherein the magnetizable feature comprises at least one planar, areal, and/or other three dimensional geometrical feature including at least one of spiral, concentric, continuous, discontinuous random and/or ordered planar and/or three dimensional features.

17. The method of claim 15 wherein forming the magnetizable feature on the member by additive manufacturing comprises at least one of selective laser sintering, selective laser melting, electron beam melting, directed energy deposition, laser metal deposition, cold spray, direct write, powder bed deposition, and wire arc deposition.

18. The method of claim 15 wherein electronics connected to sensor are configured for generating a signature associated with an angular position of the rotating body according to magnetic signals emanating from the magnetic features on the rotating body.

19. The method of claim 15 wherein the member comprises a planar metallic encoder disc and/or a cylindrical metallic encoding feature.

20. The method of claim 15 wherein the magnetizable feature comprises soft magnetic materials and/or hard magnetic materials.

* * * * *